United States Patent
Sarpatwar et al.

(10) Patent No.: US 11,599,806 B2
(45) Date of Patent: Mar. 7, 2023

(54) DEPTH-CONSTRAINED KNOWLEDGE DISTILLATION FOR INFERENCE ON ENCRYPTED DATA

(71) Applicant: International Business Machines Corporation, Armonk, NY (US)

(72) Inventors: Kanthi Sarpatwar, Elmsford, NY (US); Nalini K. Ratha, Yorktown Heights, NY (US); Karthikeyan Shanmugam, Elmsford, NY (US); Karthik Nandakumar, Singapore (SG); Sharathchandra Pankanti, Darien, CT (US); Roman Vaculin, Larchmont, NY (US); James Thomas Rayfield, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 16/907,578

(22) Filed: Jun. 22, 2020

(65) Prior Publication Data

US 2021/0397988 A1 Dec. 23, 2021

(51) Int. Cl.
*G06N 5/04* (2006.01)
*H04L 9/00* (2022.01)
(Continued)

(52) U.S. Cl.
CPC .............. *G06N 5/04* (2013.01); *G06K 9/6256* (2013.01); *G06K 9/6262* (2013.01); *G06N 3/04* (2013.01); *H04L 9/008* (2013.01)

(58) Field of Classification Search
CPC ............ G06N 5/04; G06N 3/04; G06N 5/003; G06N 3/084; G06K 9/6256; G06K 9/6262;
(Continued)

(56) References Cited

U.S. PATENT DOCUMENTS

2016/0020898 A1  1/2016  Nikolaenko et al.
2018/0349740 A1  12/2018  Schneider et al.
(Continued)

FOREIGN PATENT DOCUMENTS

CN  107124276 A  9/2017
CN  108259158 A  7/2018
(Continued)

OTHER PUBLICATIONS

International Search Report and The Written Opinion of the International Searching Authority, PCT/IB2021/053504, dated Jul. 27, 2021.

*Primary Examiner* — Juan A Torres
(74) *Attorney, Agent, or Firm* — Jeffrey S. LaBaw; David H. Judson (57) ABSTRACT

This disclosure provides a method, apparatus and computer program product to create a full homomorphic encryption (FHE)-friendly machine learning model. The approach herein leverages a knowledge distillation framework wherein the FHE-friendly (student) ML model closely mimics the predictions of a more complex (teacher) model, wherein the teacher model is one that, relative to the student model, is more complex and that is pre-trained on large datasets. In the approach herein, the distillation framework uses the more complex teacher model to facilitate training of the FHE-friendly model, but using synthetically-generated training data in lieu of the original datasets used to train the teacher.

21 Claims, 5 Drawing Sheets

(51) Int. Cl.
*G06N 3/04* (2023.01)
*G06K 9/62* (2022.01)

(58) Field of Classification Search
CPC ........ H04L 9/008; G06V 10/82; G06V 10/87; G06V 10/776
USPC .......................................................... 706/45
See application file for complete search history.

(56) References Cited

U.S. PATENT DOCUMENTS

| | | | |
|---|---|---|---|
| 2019/0334716 A1 | 10/2019 | Kocsis et al. | |
| 2020/0019867 A1* | 1/2020 | Nandakumar | G06F 21/602 |
| 2020/0104636 A1* | 4/2020 | Halevi | G06V 10/82 |
| 2021/0019443 A1* | 1/2021 | Choi | G06V 10/454 |

FOREIGN PATENT DOCUMENTS

| | | |
|---|---|---|
| CN | 108521326 | 9/2018 |
| CN | 108717514 A | 10/2018 |
| CN | 110059501 A | 7/2019 |
| CN | 110969261 A | 4/2020 |

* cited by examiner

DEPTH-CONSTRAINED KNOWLEDGE DISTILLATION FOR INFERENCE ON ENCRYPTED DATA

BACKGROUND OF THE INVENTION

Technical Field

This disclosure relates generally to the use of fully homomorphic encryption operations to facilitate inferencing against encrypted data.

Background of the Related Art

In machine learning (ML), knowledge distillation refers to learning a student model that closely mimics the predictions of a teacher model. The teacher model is usually a complex ML model pre-trained on large datasets. The student model is a target ML model with some desired characteristics, such as less model complexity, and better interpretability. Distillation is achieved by allowing the teacher to weakly supervise the learning process of the student. In this context, it is not required that teacher and student be neural networks, and the original training data (used to learn the teacher) may not be available to learn the student model.

Homomorphic encryption (HE) is a form of encryption that allows computations to be carried out on ciphertext, thus generating an encrypted result which, when decrypted, matches the result of operations performed on the plaintext. A homomorphic encryption scheme is a cryptosystem that allows computations to be performed on data without decrypting it.

Data privacy concerns often prevent the use of cloud-based machine learning services for sensitive personal data. While homomorphic encryption (HE) offers a potential solution by enabling computations on encrypted data, the challenge is to obtain accurate machine learning models that work within the multiplicative depth constraints of a leveled HE scheme. Existing approaches for encrypted inference either make ad-hoc simplifications to a pre-trained model at the cost of accuracy, or they directly train a new depth-constrained model using the original training set. In a machine learning model when encrypted data is used (e.g., decision tree-based inferencing on encrypted data), these solutions cannot work effectively because the simplification needed is much more FHE computation capability-constrained.

There remains a need to provide techniques to build machine learning models that are easily evaluated in the FHE domain (sometimes referred to below as being FHE "friendly"), but without loss of accuracy in comparison to an arbitrary and more complex model that might otherwise be desired for use in evaluating the input of interest.

BRIEF SUMMARY

This disclosure provides a method, apparatus and computer program product to create a full homomorphic encryption (FHE)-friendly machine learning model. The approach herein leverages a knowledge distillation framework wherein the FHE-friendly (student) ML model closely mimics the predictions of a more complex (teacher) model, wherein the teacher model is one that, relative to the student model, is more complex and that is pre-trained on large datasets. In the approach herein, the distillation framework uses the more complex teacher model to facilitate training of the FHE-friendly model, but using synthetically-generated training data in lieu of the original datasets used to train the teacher. In one aspect, a method to create a full homomorphic encryption (FHE)-compatible machine learning model begins by obtaining a first (teacher) machine learning model, the first machine learning model having been pre-trained using first training data. An input data distribution, and a set of FHE constraints are also received. The FHE constraints typically comprise a target multiplicative circuit depth, a security level, a ciphertext size, and combinations thereof. Using these inputs, a second (student) machine learning model is then constructed. The second model has an accuracy comparable to the first model but also, unlike the first model, satisfies the set of FHE constraints. In particular, preferably the second ML model is constructed as follows. The input data distribution is used to generate a transfer data set. Then, a set of synthetic training data is generated by the first machine learning model making predictions on the transfer data set (in lieu of the original dataset used to train the first model). The set of synthetic training data is then used to train (i.e., learn parameters) of the second model. The second model may be one of a set of candidate second machine learning models that are each trained in this manner, with a best fitting candidate being then selected as the second model. The second machine learning model, which is depth-constrained according to the FHE constraints, comprises a shallow neural network having an FHE-compatible activation function.

The second machine learning model as created in this manner is then used for privacy-preserving homomorphic inferencing on an encrypted data input.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
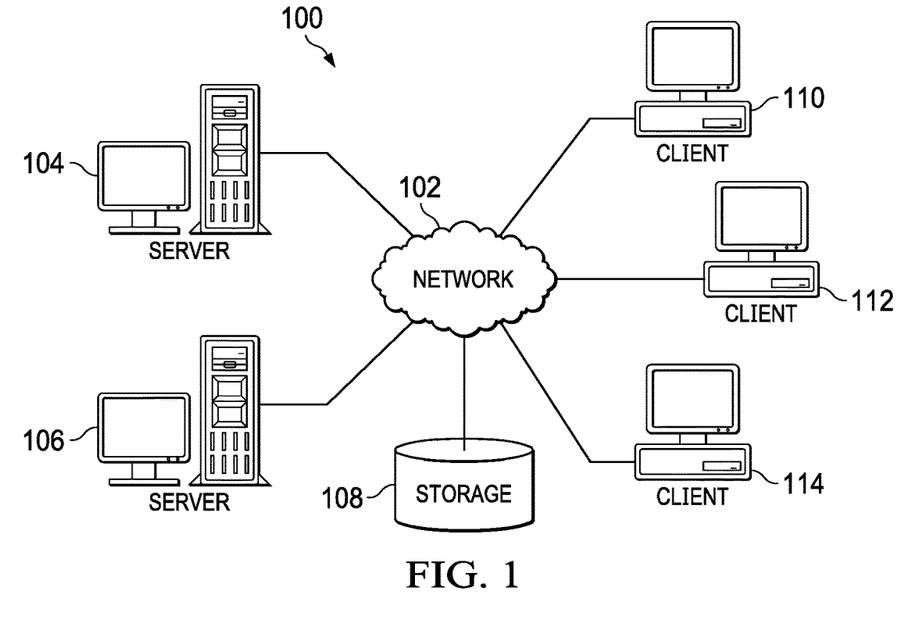
FIG. 1 depicts an exemplary block diagram of a distributed data processing environment in which exemplary aspects of the illustrative embodiments may be implemented.
Figure 2:
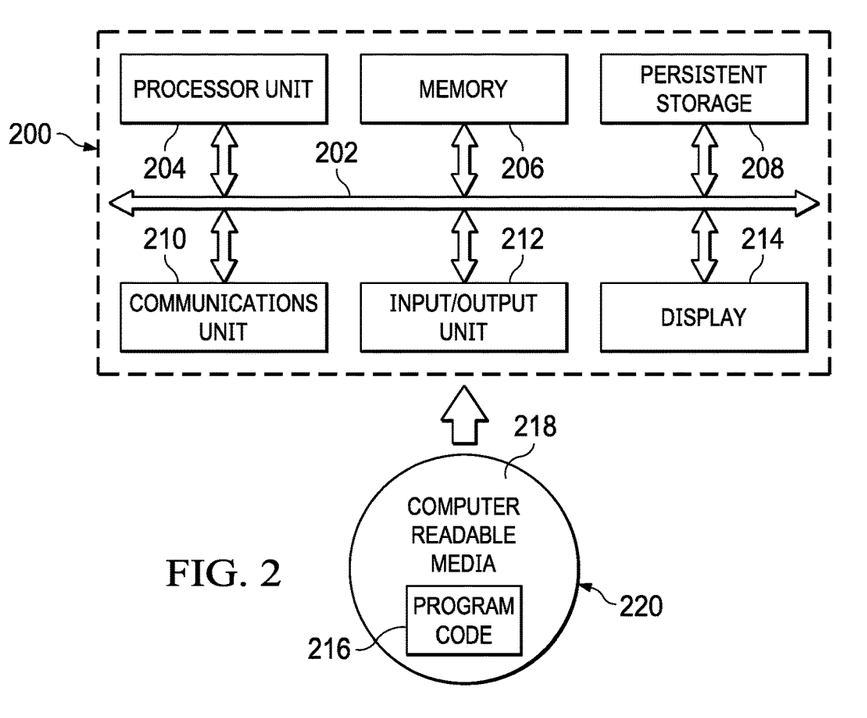
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
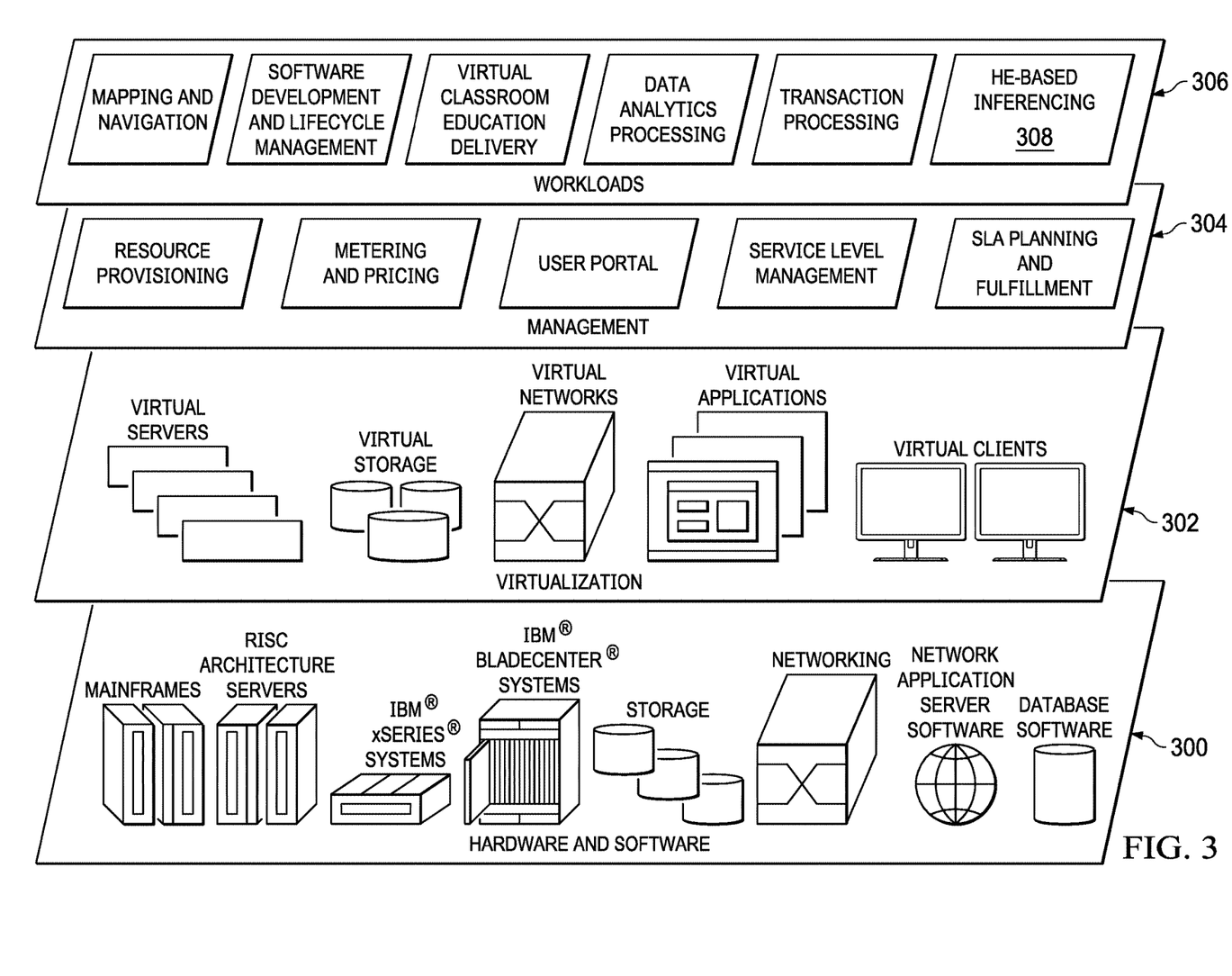
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; enterprise-specific functions in a private cloud; and, according to this disclosure, a technique for privacy-preserving homomorphic inferencing on homomorphically-encrypted data 308.

It is understood in advance that although this disclosure includes a detailed description on cloud computing, implementation of the teachings recited herein are not limited to a cloud computing environment. Rather, embodiments of the disclosed technique are capable of being implemented in conjunction with any other type of computing environment now known or later developed. These include standalone computing environments (e.g., an on-premises desktop machine), client-server-based architectures, and the like.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

The above-described commercial implementation is not intended to be limited, but rather is simply one representative embodiment of a client application supported in a cloud computing environment and that interacts with a cognitive service.

Homomorphic Encryption

Homomorphic encryption (HE) is a form of encryption that allows computations to be carried out on ciphertext, thus generating an encrypted result which, when decrypted, matches the result of operations performed on the plaintext. A homomorphic encryption scheme is a cryptosystem that allows computations to be performed on data without decrypting it. FHE is often achieved by employing a somewhat homomorphic (SWHE) or leveled HE scheme in combination with a bootstrapping or re-encryption technique. The SWHE scheme is capable of supporting computations only up to a preset level of complexity determined by its parameters. This is because the ciphertexts are "noisy," and the noise keeps growing with each HE computation, and once the noise grows beyond some parameter-dependent threshold the ciphertext can no longer be decrypted. This problem may be addressed by bootstrapping, which refreshes the ciphertext and reduces its noise level, but at the cost of relying on circular security. Bootstrapping, however, is a computationally-expensive and time-consuming operation. Therefore, for practical feasibility, the number of bootstrapping operations should be kept at a minimum and possibly avoided.

Homomorphic encryption enables the construction of programs for any desirable functionality, which can be run on encrypted inputs to produce an encryption of the result. Because such a program need never decrypt its inputs, it can be run by an untrusted party without revealing its inputs and internal state. Toolkits for implementing homomorphic encryption are known. A well-known toolkit is HElib, an open-source project. The current version of HElib supports addition and multiplication operations of arbitrary numbers in binary representation, using encryption of the individual bits.

By way of further background, several FHE schemes have been proposed based on hardness of a computational problem known as Ring Learning with Errors (RLWE). Prominent examples of such schemes include BFV (Brakerski/Fan-Vercauteren), BGV (Brakerski-Gentry-Vaikuntanathan), and CKKS (Cheon-Kim-Kim-Song) schemes, which schemes (named after the original proposers) are both additively and multiplicatively homomorphic. While the BFV and BGV schemes are efficient for vector operations over integers, the CKKS scheme is more appropriate for "approximate" (limited precision) floating-point operations. Furthermore, these schemes support Single Instruction Multiple Data (SIMD) operations, in particular, by packing different plaintext values into different slots in the ciphertext. While this ciphertext packing enables parallelization of addition and multiplication operations, it is not possible to randomly access values in the individual slots of the ciphertext after packing. Rather, only limited operations, e.g., rotation of the slots within the ciphertext, are possible.

When the CKKS scheme (as implemented in the HELib library) for HE operations, real-valued features may be input to the decision tree directly, i.e., there is no requirement to transform the inputs as integers.

Machine Learning-as-a-Service Using Homomorphic Encryption

Machine Learning as a Service (MLaaS) is now a popular paradigm, where pre-trained models are hosted on a public cloud and inference is performed on a pay-per-query basis. The use of MLaaS, however, is restricted in many application domains (e.g., financial services, healthcare) because the privacy (confidentiality) of the client data on which the inference is performed is of utmost concern. Fully homomorphic encryption (FHE) can solve the above privacy conundrum by allowing certain types of computations on encrypted data without the need for decryption. As noted above, an FHE scheme can be defined as: H=($\mathcal{E}, \mathcal{D}, \lambda$, EV AL), where $\mathcal{E}$ and $\mathcal{D}$ represent encryption and decryption operations, respectively, $\lambda$ is the security parameter, and EV AL is the evaluate function, which takes an arbitrary function f and an encrypted input $\mathcal{E}$ (I) and returns the encrypted result EV AL(f,$\mathcal{E}$ (I))=$\mathcal{E}$ (f(I)). For ease of presentation, it is understood that the $\mathcal{E}$ and EV AL operations require access to the public key and $\mathcal{D}$ needs access to the private key.

Figure 4:
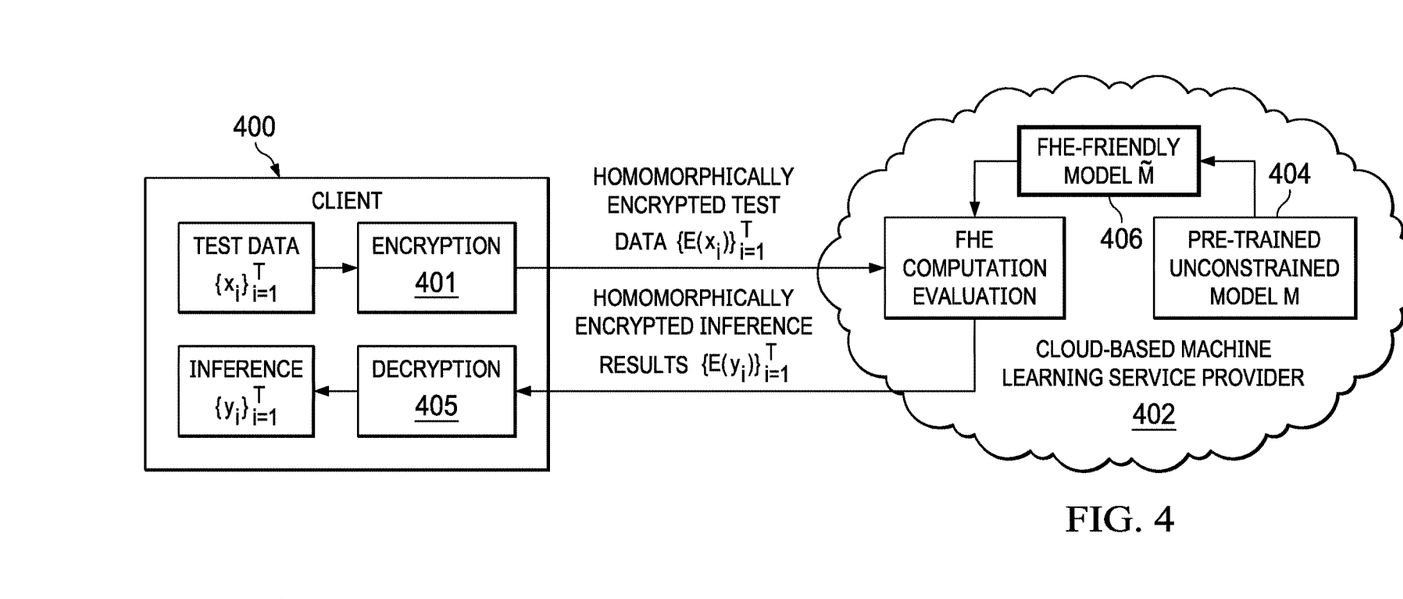
FIG. 4 depicts a Machine Learning as-a-service (MLaaS) operating environment in which the techniques of this disclosure may be implemented.

With reference now to FIG. 4, an FHE-based privacy-preserving inference scenario is depicted and works as follows. The client 400 encrypts its data x (using encryption function 401) and sends the encrypted data $\mathcal{E}$ (x) to the cloud-based machine learning service provider 402. The service provider, who holds a pre-trained model 404 $\mathcal{M}_\Theta$ where $\mathcal{M}$ and $\Theta$ denote the model architecture and parameters, respectively), performs inference computation in the encrypted domain($\mathcal{E}$ (y)=EV AL ($\mathcal{M}_\Theta$, $\mathcal{E}$ (x))), and returns the encrypted result back to the client 400 for decryption 405. Because the service provider does not gain any knowledge about the input (x) or the resulting output (y), complete client data privacy is guaranteed. Furthermore, the above-described scenario is referred to as non-interactive because it involves only a single round of communication between the client and the service provider.

A fundamental challenge in encrypted inference such as depicted in FIG. 4 arises from the serious restrictions in terms of the nature of feasible computations and the efficiency of computations in the encrypted domain. Most FHE schemes are constructed based on a leveled HE scheme, which supports computations only up to a preset level of multiplicative depth determined by its parameters. This is because the "noise" in the ciphertexts keeps growing with each HE computation and decryption will fail once the noise grows beyond a threshold. This depth constraint can be surmounted using bootstrapping, which "refreshes" the ciphertext and reduces its noise level (at the cost of relying on circular security). Bootstrapping, however, is a highly expensive and complex operation that must be avoided or used sparingly for the computations to be practically feasible. In a ML context, the problem of limited depth is further exacerbated by the presence of non-linear computations (e.g., comparison of two numbers, activation functions), which require a larger depth because the underlying HE schemes often support only additive and multiplicative homomorphism. Due to these reasons, it is seldom possible to directly use any pre-trained ML model for encrypted inference. For instance, while boosted decision trees are still the standard choice for classification and regression tasks over tabular datasets, directly applying them on encrypted data is difficult due to their reliance on comparison operations.

Recent works on encrypted inference have attempted to solve this problem in two ways. One approach is to train an unconstrained model and then simplify its architecture to reduce the multiplicative depth, without re-training the parameters. The other alternative is to define a depth-constrained model architecture and directly train it from scratch using the available training data. While the former approach typically leads to significant loss of inference accuracy compared to the original model, the latter approach may not be possible in practice because the training data used to train the original model may no longer be available. Ideally, and as depicted in FIG. 4, it would be desirable to transform any given pre-trained model $\mathcal{M}_\Theta$ 404 into its depth-constrained version $\widetilde{\mathcal{M}}_{\tilde{\Theta}}$ 406 without access to the original training data, all while minimizing any accuracy degradation.

With the above as background, the technique of this disclosure is now described.

Building a FHE-Friendly Machine Learning Model

Figure 5:
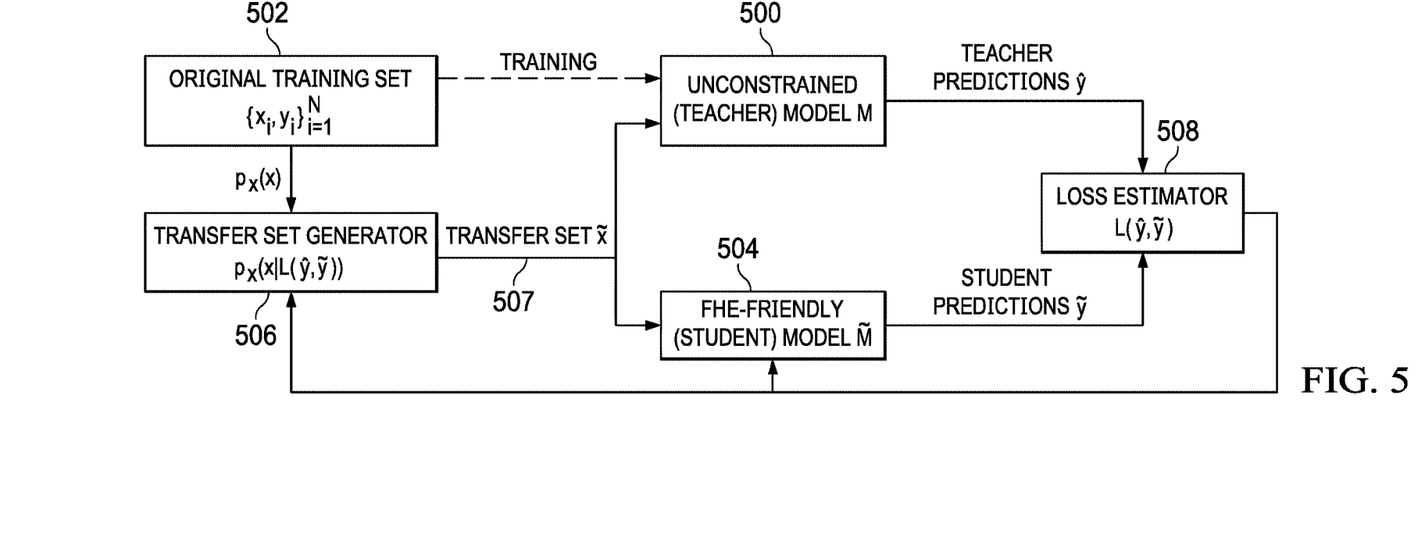
FIG. 5 depicts how the distillation framework of this disclosure is used to build a FHE-friendly student model.

The basic paradigm of this disclosure is depicted in FIG. 5. As shown, the system (sometimes referred to herein as a knowledge distillation framework) receives a teacher model 500. The teacher model is unconstrained and has been trained using an original training set 502. The teacher model has high accuracy, but it is not compatible (friendly) to performing inferencing in an FHE domain. A goal then is to build an FHE-friendly student model 504 that has accuracy comparable to the teacher model, i.e., it mimics the decision boundary of the more complex teacher model while still enabling inferencing on encrypted data. In this manner, the student model 504 serves as a proxy for the teacher model 500 with minimal loss in accuracy.

According to this disclosure, the student model 504 is built as follows. First, a transfer data set 507 is generated by a transfer set generator 506. The transfer data set 507 is generated, preferably randomly, using a given input data distribution associated with the teacher model. There is no requirement that the given input data distribution have any associated labels. In addition, the input data distribution is also used to randomly generate a validation data set (not shown) that, as described below, is used to facilitate selection of the student model from a pool of student models that are compatible with a set of FHE constraints. These constraints may vary but typically include target multiplicative circuit depth, security level, ciphertext size, and the like. The multiplicative circuit depth, e.g., is the maximum number of sequential multiplication operations needed for a computation. The security level captures how hard it is to break the encryption, and this parameter may depend on the parameters of the underlying encryption scheme and depth of the computation at hand; the higher the security level, the higher the inference time, and wherein lower computation depth translates into higher security for the same ciphertext parameters. Ciphertext size involves choosing hyperparameters of the ML model (e.g., the number of hidden nodes) to make the most efficient use of the ciphertext slots. Other possible FHE constraints (including combinations of the above) may be taken into consideration.

Referring back to FIG. 5, in this approach preferably a student model architecture is selected from an FHE-friendly hypothesis space (namely, a set of all models that satisfy the given FHE constraints). Then, and as depicted, the parameters of the student model 504 are learned using, as "synthetic" training data, the transfer data set 507, and predictions of the teacher model 500 on that transfer data set. Any supervised training algorithm (e.g., gradient descent) may be used for this purpose. One or more "candidate" student models may then be trained in this manner, i.e., using the teacher model's predictions on the transfer data set 507. During this process, preferably a fitness of each candidate student model is also computed using the validation data set, and predictions of the teacher model on the validation data set. Any standard fitness (goodness) measure (e.g., accuracy) may be used for this purpose. A loss estimator 508 evaluates the fitness computations and selects the student model with the best goodness measure as the FHE-friendly model. In this approach, and while the student model strives to minimize the loss between the predictions of the teacher and student models on the transfer data set, preferably the transfer set generator 506 also is configured to generate more challenging input samples that maximize this loss.

Summarizing, and as FIG. 5 depicts, the approach herein provides a technique for transferring the knowledge embedded in a pre-trained first (teacher) model to a second depth-constrained (student) model without access to the original training data used to train the first model.

Figure 7:
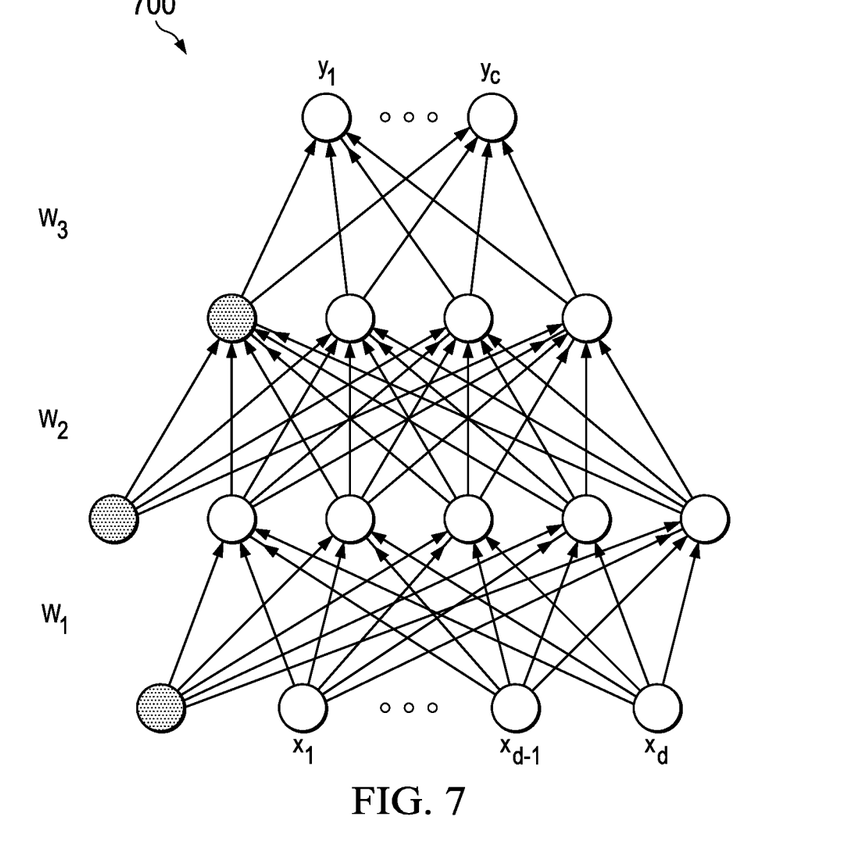
FIG. 7 depicts a representative neural network architecture from which a student model is constructed according to a representative embodiment.

With reference now to FIG. 7, an FHE-friendly student architecture search may be used in the above process to choose the student model. This assumes a mechanism to evaluate the FHE-friendliness of the chosen architecture. As shown the student model 700 may be a multi-layer feed forward neural network. As depicted, a hyperparameter search space (from which the student model may be constructed) includes a number of layers, a number of hidden nodes in each layer, an activation function at each layer, etc. Depth-constrained knowledge distillation for HE inference of decision tree ensembles may then proceed as follows. Given a multiplicative depth budget, compute the set of configurations of neural networks, along with polynomial activation functions that satisfy the depth budget. Then, as previously described, generate the augmented data from given unlabeled data (e.g., a tiny fraction of the original data), and generate labels using the ensemble. Then, search for the best possible neural network in terms of the validation score. This operation may be carried out in unencrypted space. Thereafter, HE inferencing is performed on the best network as a proxy for the original ensemble.

The above approach minimizes the accuracy loss, preferably by searching for the best student model architecture that operates within the given depth constraints, and then training this student model preferably using only synthetic data sampled from the original training data distribution.

In FHE-based computation, there are several parameters the define the computational complexity. As noted above, these include multiplicative depth, the choice of security parameters, the choice of the number of ciphertexts, and others. Minimizing the use of bootstrap techniques to reduce noise (because a bootstrap operation is very expensive), the technique herein builds ML inference models that are accurate and closer to the performance of the original complex model. To facilitate learning the student model, the framework assumes that the original training set used to train the complex model is not available. Instead, preferably the approach herein creates artificial training feature data, and then generates labels for the training features using the original complex model. The shallow network is trained with FHW-aware computations to make it easier for the simpler model to be mapped to FHE scheme.

Figure 6:
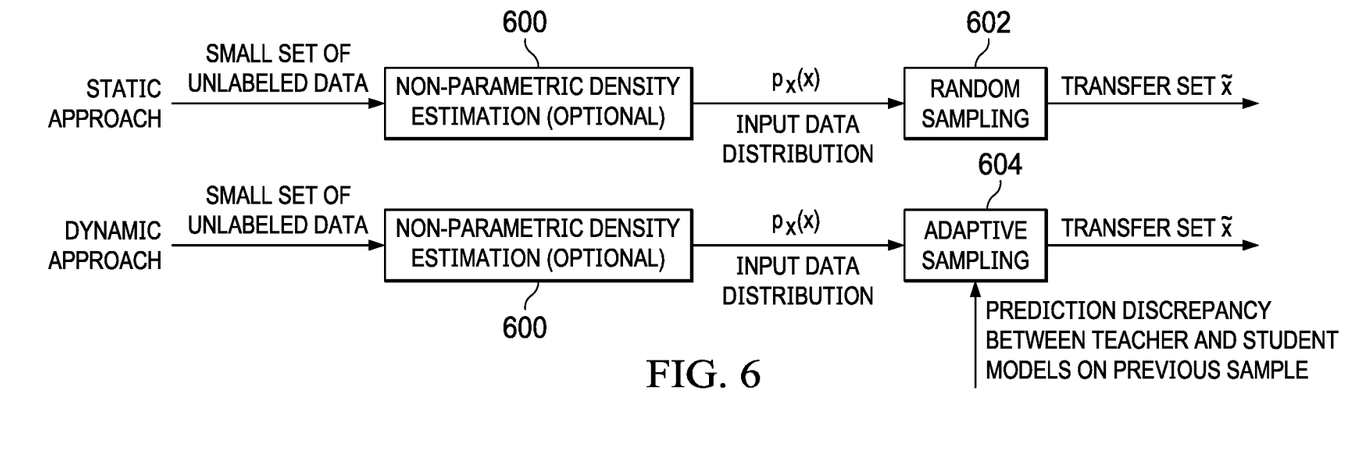
FIG. 6 depicts an operation of a transfer data set generator of this disclosure.

FIG. 6 depicts a technique implemented by the transfer set generator to generate the transfer data set. In a first embodiment, which is a static approach, a small set of unlabeled data is input to a non-parametric density estimation function 600, although this is not required. The resulting input data distribution is the randomly-sampled by random sampling function 602 to generate the transfer data set. In an alternative embodiment, which is a dynamic approach, the small set of unlabeled data is input to the non-parametric density estimation function 600, with the resulting input data distribution applied to an adaptive sampling function 604, which also receives as input a prediction discrepancy between the teacher and student models on a previous sample. Adaptive sampling function 604 uses these inputs to generate the transfer data set.

Although not depicted, random or adaptive sampling may also be used to generate the validation data set that is used to facilitate the selection of a best-fit candidate student model.

The following section provides a more detailed description of an implementation of the above-described techniques.

Depth-Constrained Knowledge Distillation for Inference on Encrypted Data

As referenced above. the technique herein applies a knowledge distillation framework for the purpose of obtaining a (multiplicative) depth-constrained student model, which mimics the decision boundary of complex teacher models while enabling encrypted inference. As will also be described, in one implementation, the framework provides an algorithm to search for the best student model that can be trained accurately even if the complete training set (used to train the original model) is not available.

In particular, this disclosure provides a technique to construct a depth-constrained machine learning model ($\widetilde{M}$) that is equivalent to (or closely mimics) the decision behavior of a given pre-trained model ($\mathcal{D}$). The original ($\mathcal{D}$) and depth-constrained ($\widetilde{M}$) learners need not belong to the same family of ML models. Here, depth refers to the multiplicative depth of the model, which is defined as follows:

Definition: (Multiplicative Depth of a Machine Learning Model)

The multiplicative circuit depth of a machine learning model M, denoted by $\Phi(\mathcal{D})$, is the maximum number of multiplicative operations (gates) required along any of its circuit paths. Let $\mathcal{D}: X \rightarrow \mathcal{Y}$ be the pre-trained model, where X and $\mathcal{Y}$ denote the input and output spaces, respectively. Let $\mathcal{T} = \{(x_i, y_i)\}_{i=1}^{T}$ be the training data used to learn the parameters $\Theta$ of model $\mathcal{D}$, where $\mathcal{T}$ is the number of training samples, and $p_x$ denote the training data distribution. Let $\mathcal{L}$ be the distillation loss function that measures the prediction differences between $\mathcal{D}$ and its $\mathcal{L}$ approximate version $\widetilde{M}$. The problem of learning a depth-constrained model can be formally stated as equation (1) (for $\widetilde{M}_{\tilde{\Theta}}$):

$$\operatorname{argmin} \mathbb{E}_{x \sim p_x} \mathcal{L}(\mathcal{D}_\Theta(x), \widetilde{M}_{\tilde{\Theta}}(x)), \widetilde{M} \in \mathcal{H}_\Omega$$

where $\mathcal{H}_\Omega$ is the depth-constrained hypothesis space, i.e., the set of all models whose multiplicative depth is less than or equal to $\Omega$. Because it is often impractical to directly estimate the expected distillation loss in the above equation, it can be replaced with the empirical risk. If the original training data $\mathcal{T}$ is available, the empirical risk minimization problem can be stated as equation (2) (for $\widetilde{M}_{\tilde{\Theta}}$):

$$\operatorname{argmin} \Sigma_{i=1}^{T} \mathcal{L}(\mathcal{D}_\Theta(x_i), \widetilde{M}_{\tilde{\Theta}}(x_i)), \widetilde{M} \in \mathcal{H}_\Omega$$

The approach herein assumes that, in the usual case, the original training data $\mathcal{T}$ is no longer available (or not available for training). In the context of encrypted inference, typically this is a valid assumption because the model $\mathcal{D}$ is generally trained using sensitive personal information that cannot be retained indefinitely. Note that this assumption rules out the possibility of "throwing" out the given pre-trained model $\mathcal{M}_\Theta$ and retraining a depth-constrained model from scratch. As will be described, the technique herein overcomes the unavailability of original training data using a knowledge distillation framework. As noted above, knowledge distillation refers to the process of learning a student model that closely mimics the predictions of a teacher model, which is typically achieved by allowing the teacher to weakly supervise the learning process of the student. Specifically, given a transfer set of input data samples (without true labels), the predictions made by the teacher model on this transfer set are used as the proxy labels to train the student model instead of the true labels.

The following describes a representative algorithm for learning $\widetilde{\mathcal{M}}_{\tilde\Theta}$ from $\mathcal{M}_\Theta$. In one non-limiting embodiment, the inputs to the algorithm are the pre-trained model $\mathcal{M}_\Theta$, input data distribution $p_x$, multiplicative depth budget $\Omega$, distillation loss function $\mathcal{L}$, transfer set size $\mathcal{S}$, and validation set size V. The outputs are the depth-constrained model $\widetilde{\mathcal{M}}_{\tilde\Theta}$ that closely approximates $\mathcal{M}_\Theta$ and its validation score v. At step (1), generate the transfer set $\mathcal{S}=\{\tilde{x}_i\}_{i=1}^S$ and validation set $V=\{\bar{x}_i\}_{i=1}^V$, where $\tilde{x}_i, \bar{x}_i \sim p_x$. At step (2), a model architecture $\widetilde{\mathcal{M}}$ is selected from the hypothesis space $\mathcal{H}_\Omega$. At step (3), $\tilde\Theta$ is learned as $\mathrm{argmin}_{\tilde\Theta}\Sigma_{i=1}^S\mathcal{L}(\mathcal{M}_\Theta(\tilde{x}_i), \widetilde{\mathcal{M}}_{\tilde\Theta}(\tilde{x}_i))$. At step (4), the validation score v is computed as the accuracy of the candidate model $\widetilde{\mathcal{M}}_{\tilde\Theta}$ on the validation set $V^*=\{\bar{x}_i, \mathcal{M}_\Theta(\bar{x}_i)\}_{i=1}^V$.

Transfer Set Generation

A first aspect in knowledge distillation is how to obtain the transfer set of unlabeled input samples required for the distillation. In one known approach, the original training data (minus the output labels) is used as the transfer set. An alternative is to employ synthetically-generated pseudo training samples that can be generated at the time of distillation. Because the teacher model has been trained only on the manifold $p_x$ of the training data, its knowledge does not necessarily cover the whole input space. Consequently, when random inputs that do not lie on the manifold $p_x$ are fed to the teacher model, the resulting predictions may not be sufficiently reliable to train the student model. Therefore, some knowledge of the input data manifold may be required for synthetic transfer set generation. More recently, attempts have also been made to perform knowledge distillation without access to any training data. These methods, however, assume the teacher model is a deep neural network with a final softmax layer capable of producing the label distribution as the output. Here, it is assumed that the service provider retains minimal information about the training data distribution $p_x$. Further, and in one example implementation herein (see, e.g. FIG. 6), an algorithm in which a non-parametric density estimate of $p_x(x)$ is obtained from a small subset of training data (without labels) (e.g., a modified version of the MUNGE algorithm), is used to generate a large unlabeled set that can then be used for distillation.

In this approach herein, the synthetic dataset $\mathcal{S}$ is generated using only the knowledge of $p_x$. In part, this is because the student model typically is constrained to the hypothesis space $H_\Omega$ and the size of the synthetic dataset $\mathcal{S}$ is finite due to the practical limitations. As a variant approach, when the distillation loss is low, the transfer set generator can be used to generate more challenging input samples to discriminate between the predictions of the teacher and student models.

Depth-Constrained Student Architecture Search

A second aspect in knowledge distillation is the appropriate choice of the student network architecture. Typically, the architecture of the student network is fixed based on the computational resource and memory requirements of the target environment, where the student is expected to be deployed. The approach herein designs a student network with a limited multiplicative depth. The depth constraints complicate the search for the optimal student model in the following way. Suppose that a multi-layer perceptron with a sigmoid activation function is chosen as the student model. Given a limited multiplicative depth (say $\Omega$), it is not clear if the available depth should be earmarked for approximating the sigmoid function more accurately (say, using a higher-order polynomial), or adding more hidden layers to the network. In the approach herein, preferably a shallow neural network is employed as the student model architecture. This is motivated by the notion that a fully-connected sigmoid neural network with one single hidden layer can universally approximate any continuous univariate function. It has also been shown that this proof can be extended to any non-polynomial function as an activation function. Because a goal of this technique is to approximate the decision function learned by the teacher model, a neural network is an appropriate choice for the student model. That said, because there may be other constraints or restrictions (e.g., using only polynomial approximations of non-linear activation functions such as sigmoid and ReLU), preferably more hidden layers are added to the network to increase the modeling capacity. To determine the best student model architecture, preferably steps (2) through (4) of the above-described algorithm are repeated for many choices of $\widetilde{\mathcal{M}} \in \mathcal{H}_\Omega$ and choose the student model with the highest validation score.

Application to Homomorphic Inference of Decision Tree Ensembles

As one example application of the depth-constrained knowledge distillation framework herein, the following describes how to perform encrypted inference with respect to large ensembles of decision tree classifiers. Unlike recent efforts that transfer knowledge from a complex model (neural networks and boosted trees) into a single decision tree to leverage the interpretable nature of decision trees, the technique herein distills the knowledge from a tree ensemble to a depth-constrained neural network (referred to as a DTNet) for facilitating inference on (homomorphically) encrypted data. In particular, preferably the disclosed technique replaces a decision node with a comparator (in the original model) with a simpler and shallower neural network (the DTNet). In this replacement, preferably the standard activation function (in the original model) is replaced with a simpler (from the FHE perspective) activation function.

The template structure of the DTNet neural network is now described. The input layer comprises d nodes for input data with d features. The hidden layers are dense (fully connected) layers with a specified number of nodes (neurons) and a specified polynomial activation function. The output layer is a softmax layer with c nodes, where c is the number of classes in the classification task. When performing the homomorphic inference, the final softmax computation can be delegated to the client.

The DTNet has a low computational depth, which allows efficient and accurate homomorphic inference to be performed on these model. Indeed, the inference predictions on the DTNet in the encrypted space are virtually identical to those in the unencrypted space. Further, the DTNet can approximate inference on an ensemble of decision trees quite closely even when the amount of training data available is very low. Hence, and generalizing, DTNets are used to effectively approximate homomorphic inference on the tree ensemble.

The technique of this disclosure provides significant advantages. It provides for a systematic approach to perform multiplicative depth-constrained knowledge distillation that enables efficient encrypted inference. In one embodiment, the approach enables performing highly-efficient encrypted inference on complex ensembles of decision trees. For example, the approach herein provides a highly-efficient way to perform encrypted inference on complex ensembles (e.g., 100s of base estimators) of decision trees, achieving roughly three (3) orders of magnitude improvement in speed over the standard approach of directly replacing hard comparison at each decision node by a soft comparison. The system is highly-scalable in multi-core cloud environments, and the approach may be implemented with several real-world public datasets.

There is no limitation on potential use cases, as the technique may be used to support any cloud-based machine learning services that need to comply with privacy regulations or other security requirements. Many new industry applications may use this type of cloud service and thus provide enhanced privacy guarantees. Two examples are healthcare and finance, where compliance with respect to client privacy is paramount. As noted, the three (3) basic components in the machine learning as a service scenario are client, server, and the communication infrastructure. Because the data is encrypted and the result comes back encrypted, any attacks on the server or the communication channels are effectively thwarted.

As described, typically a computing system that implements this approach is implemented in software, e.g., as a set of computer program instructions executed by one or more hardware processors. A particular tool or component in the system may comprise any number of programs, processes, execution threads, and the like, together with appropriate interfaces and databases to support data used or created by the tool or component. The tool or component may be configured or administered with a web-based front-end, via a command line, or the like. The tool or component may include one or more functions that are implemented programmatically, or that interoperate with other computing entities or software systems via an application programming interface (API), or any convenient request-response protocol.

Any references herein to one or more commercial products or services are exemplary and should not be taken to limit the disclosed technique, which may be implemented on any system, device, appliance (or, more generally, machine) having the general characteristics and operating functionality that has been described.

As noted, one preferred implementation of this subject matter is as-a-service, but this is not a limitation either. HE-based inferencing may be carried out entirely on-premises or in a standalone operating environment. As previously noted, and without limitation, the subject matter may be implemented within or in association with a cloud deployment platform system or appliance, or using any other type of deployment systems, products, devices, programs or processes. As has been described, the model building or inferencing system functionality may be provided as a standalone function, or it may leverage functionality from other products and services.

A representative cloud application platform with which the technique may be implemented includes, without limitation, any cloud-supported application framework, product or service.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the generator service be executed by a particular component as named above, as the functionality herein (or any aspect thereof) may be implemented in other or systems.

The tool and response functionality can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the sensitive data detection service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Further, FHE is just a representative cryptographic protocol, and it is not intended to be limited.

Although the approach described above implements FHE-based inferencing in a client-server context, this is not a limitation. The above-described technique may also be implemented within a client that has access to the tree.

Moreover, while inferencing preferably occurs using an FHE protocol, the approach herein may be leveraged with other multi-party secure computation techniques and privacy of the test point, the model, or both, desired to be preserved.

The techniques herein provide for improvements to another technology or technical field, namely, FHE-based inferencing tools and systems, and cloud-based systems that incorporate or expose such technologies, as well as improvements to the computational efficiency of FHE systems and methods.

The particular use case or application for which the framework is being used in not a limitation of this disclosure.

Although the approach herein envisions the server performing one or more operations described in advance of receipt of the FHE-encrypted data points, this pre-processing is not necessarily a requirement. An alternative approach is that the server performs all of some of this processing on-demand (i.e., dynamically) in response to receipt of the client query.

Having described the subject matter, what is claimed is as follows:

1. A method to create a full homomorphic encryption (FHE)-compatible machine learning model, comprising:
    obtaining a first machine learning model, the first machine learning model having been pre-trained using first training data;
    receiving an input data distribution, and a set of FHE constraints; and
    constructing a second machine learning model that satisfies the set of FHE constraints, the second machine learning model constructed by:
        using the input data distribution to generate a transfer data set; and
        learning parameters of the second machine learning model using, as synthetic training data, predictions of the first machine learning model on the transfer data set.

2. The method as described in claim 1 wherein the second machine learning model parameters are learned without access to the first training data.

3. The method as described in claim 1 wherein constructing the second machine learning model further includes:
    using the input data distribution to generate a validation data set;
    for each a set of candidate second machine learning models, determining a fitness of the second machine learning model using, as synthetic validation data, predictions of the first machine learning model on the validation data set; and
    selecting, as the second machine learning model, a candidate second machine learning model that has a best fit.

4. The method as described in claim 1 wherein the set of FHE constraints comprise one of: a target multiplicative circuit depth, a security level, a ciphertext size, and combinations thereof.

5. The method as described in claim 1 further including using the second machine learning model for privacy-preserving homomorphic inferencing on the encrypted data.

6. The method as described in claim 5 wherein the second machine learning model is used in lieu of the first machine learning model.

7. The method as described in claim 1 wherein the second machine learning model comprises a shallow neural network having an FHE-compatible activation function.

8. An apparatus, comprising:
a processor;
computer memory holding computer program instructions executed by the processor, the computer program instructions configured to create a full homomorphic encryption (FHE)-compatible machine learning model, the computer program instructions configured to:
obtain a first machine learning model, the first machine learning model having been pre-trained using first training data;
receive an input data distribution, and a set of FHE constraints; and
construct a second machine learning model that satisfies the set FHE constraints, the second machine learning model constructed by:
using the input data distribution to generate a transfer data set; and
learning parameters of the second machine learning model using, as synthetic training data, predictions of the first machine learning model on the transfer data set.

9. The apparatus as described in claim 8 wherein the second machine learning model parameters are learned without access to the first training data.

10. The apparatus as described in claim 8 wherein the computer program instructions that construct the second machine learning model further include computer program instructions executed by the data processing system to:
use the input data distribution to generate a validation data set;
for each a set of candidate second machine learning models, determine a fitness of the second machine learning model using, as synthetic validation data, predictions of the first machine learning model on the validation data set; and
select, as the second machine learning model, a candidate second machine learning model that has a best fit.

11. The apparatus as described in claim 8 wherein the set of FHE constraints comprise one of: a target multiplicative circuit depth, a security level, a ciphertext size, and combinations thereof.

12. The apparatus as described in claim 8 wherein the computer program instructions are further executed by the data processing system to use the second machine learning model for privacy-preserving homomorphic inferencing on the encrypted data.

13. The apparatus as described in claim 12 wherein the second machine learning model is used in lieu of the first machine learning model.

14. The apparatus as described in claim 8 wherein the second machine learning model comprises a shallow neural network having an FHE-compatible activation function.

15. A computer program product in a non-transitory computer readable medium for use in a data processing system to create a full homomorphic encryption (FHE)-compatible machine learning model, the computer program product holding computer program instructions that, when executed by the data processing system:
obtain a first machine learning model, the first machine learning model having been pre-trained using first training data;
receive an input data distribution, and a set of FHE constraints; and
construct a second machine learning model that satisfies the set FHE constraints, the second machine learning model constructed by:
using the input data distribution to generate a transfer data set; and
learning parameters of the second machine learning model using, as synthetic training data, predictions of the first machine learning model on the transfer data set.

16. The computer program product as described in claim 15 wherein the second machine learning model parameters are learned without access to the first training data.

17. The computer program product as described in claim 15 wherein the computer program instructions that construct the second machine learning model further include computer program instructions executed by the data processing system to:
use the input data distribution to generate a validation data set;
for each a set of candidate second machine learning models, determine a fitness of the second machine learning model using, as synthetic validation data, predictions of the first machine learning model on the validation data set; and
select, as the second machine learning model, a candidate second machine learning model that has a best fit.

18. The computer program product as described in claim 15 wherein the set of FHE constraints comprise one of: a target multiplicative circuit depth, a security level, a ciphertext size, and combinations thereof.

19. The computer program product as described in claim 15 wherein the computer program instructions are further executed by the data processing system to use the second machine learning model for privacy-preserving homomorphic inferencing on the encrypted data.

20. The computer program product as described in claim 19 wherein the second machine learning model is used in lieu of the first machine learning model.

21. The computer program product as described in claim 15 wherein the second machine learning model comprises a shallow neural network having an FHE-compatible activation function.

* * * * *